US008560502B2

(12) United States Patent
Vora (10) Patent No.: US 8,560,502 B2
(45) Date of Patent: Oct. 15, 2013

(54) METHOD AND A SYSTEM FOR REPLAYING DATABASE WORKLOAD WITH TRANSACTIONAL CONSISTENCY

(75) Inventor: Krishna Vora, Mumbai (IN)

(73) Assignee: Exact Solutions, Inc., New York, NY (US)

( * ) Notice: Subject to any disclaimer, the term of this patent is extended or adjusted under 35 U.S.C. 154(b) by 0 days.

(21) Appl. No.: 13/173,366

(22) Filed: Jun. 30, 2011

(65) Prior Publication Data

US 2012/0005174 A1    Jan. 5, 2012

(30) Foreign Application Priority Data

Jul. 2, 2010    (IN) .......................... 1935/MUM/2010

(51) Int. Cl.
*G06F 7/00*    (2006.01)
(52) U.S. Cl.
USPC .......................................... 707/648; 707/703

(58) Field of Classification Search
None
See application file for complete search history.

(56) References Cited

U.S. PATENT DOCUMENTS

| 7,076,489 | B2 * | 7/2006 | Begg et al. .............................. 1/1 |
| 7,467,141 | B1 * | 12/2008 | Steele et al. ........................... 1/1 |
| 7,734,859 | B2 * | 6/2010 | Daniel et al. .................... 710/315 |
| 2002/0062369 | A1 * | 5/2002 | von Klopp et al. ............ 709/224 |
| 2004/0042483 | A1 * | 3/2004 | Elzur et al. ..................... 370/463 |

* cited by examiner

*Primary Examiner* — Robert Beausoliel, Jr.
*Assistant Examiner* — Nirav K Khakhar
(74) *Attorney, Agent, or Firm* — Cowan, Liebowitz & Latman, P.C.; Mark Montague (57) ABSTRACT

The present invention relates to a method and a system for replaying full scale Production Database workload using Network or Kernel Capture. In one embodiment, the capture of the Server workload is done using Network Capture or using Kernel drivers. The captured workload is then pre-processed and Replayed to a test system along with full transactional integrity.

35 Claims, 2 Drawing Sheets

METHOD AND A SYSTEM FOR REPLAYING DATABASE WORKLOAD WITH TRANSACTIONAL CONSISTENCY

REFERENCE TO RELATED APPLICATION AND CLAIM OF PRIORITY

This application claims the benefit of Indian Patent Application No. 1935/MUM/2010, filed on Jul. 2, 2010, the entire contents of which are incorporated herein by reference.

FIELD OF THE INVENTION

The present invention relates to databases and more particularly relates to capturing database workloads and replaying that workload in a test system with transactional consistency.

BACKGROUND

In large Enterprise Level Database installations, performance is critical. Business conditions place pressure on extracting more performance with minimal expenses. To achieve more performance, installations/changes that are made to the databases are accurately assessed before implementation in the real time Production system. Changes could include, upgrading the database or modifying the database configurations for tuning purposes. After the changes are made, assessment of possible risks is performed in order to be confident that the changes do not cause problems in the production system. For this purposes, organizations have relied on traditional simulators and extensive testing and validation techniques or test scripts which fire the same production workload onto a Test Database.

Traditional approaches have relied on intrusive solutions, such as using Database Transaction Logs to capture production workload. These solutions lay finite load on the database performance which is undesirable in production environments. These approaches are also have an ineffective way of identifying the change responses since they capture only updates to the database and do not capture 'Select' queries or read-only queries made to the database. They also do not capture the native complexity involved such as the interaction amongst different client sessions and timing issues.

To effectively analyze the changes, administrators need to have the complete workload with all of the client sessions, users, Queries, timing and Concurrency present in the original workload to be replicated to a Test Database during the replay without the imposing undue load on the production server during the capture.

Currently, the only available solution which satisfies most of these requirements is Oracle DBReplay provided by Oracle. This solution relies on capturing the complete workload directly from the Oracle Production Server process. The Oracle production server will record all transactions onto local disk storage. However, Oracle DBReplay places some load on the production database. Furthermore, Oracle DBReplay is only supported for Oracle databases.

Some of the documents which are available in this area include U.S. Pat. No. 7,096,264 granted to Bonney et al., U.S. Patent Publication No. 2005/0141432 filed by Mihai Sirbu, U.S. Patent Publication No. 2008/0097995 filed by Dias et al., and 2008/0097996 filed by Dias et al., contents of each of which is incorporated herein.

Therefore, there arises a need for a system and a method that does not place any load on the Production Database overcoming the problems existing in the art.

OBJECTIVE OF THE INVENTION

The objective of the present invention is to provide a test system and a method implemented by the same that at least partly addresses the aforesaid lacunae.

The present invention seeks to satisfy the requirements for a solution which does not place any load on the Production Database and yet captures and replays the complete workload with all the native complexity involved onto a Test Database.

SUMMARY OF THE INVENTION

Accordingly, the present invention provides a method for generating database transactions compatible for replaying, said method comprising: capturing data transmitted to/received from a source database server using either Network Traffic capture or Kernel based Traffic captures or both; extracting transactions from the data thus captured and storing the extracted transactions; reordering the extracted transactions thus stored based on TCP header/footer information to obtain reordered transactions; and pre-processing the reordered transactions based on multiple configuration parameters selected from a group comprising Target server IP/Ports, Target server user passwords, Replay Start Point, Session Level Filters, Compression Rate, Target Server Service Name, SSL Replay Session Level Filters, and Query Level Filters and database commit dependency to generate pre-processed database transactions compatible for replaying.

Further, the present invention provides a method for replaying database transactions, said method comprising: re-mapping configuration and run time parameters of a target database server with the respective parameters of a source database server, said parameters include but not limited to Server capabilities, Login password, Server service name, SQL cursor IDs, Large Object (LOB) descriptors, ROWIDs; and reading and replaying database transactions onto the target database server, wherein the said database transactions thus read and replayed are based on database transactions that occurred on the source database server and that have been reordered based on TCP header/footer information and pre-processed based on multiple configuration parameters selected from a group comprising Target server IP/Ports, Target server user passwords, Replay Start Point, Session Level Filters, Compression Rate, Target Server Service Name, SSL Replay Session Level Filters, and Query Level Filters and database commit dependency. Furthermore, the present invention provides a method for replaying database transactions, said method comprising: capturing database transactions occurring on a source database server and storing the captured transactions; reordering the captured transactions to obtain reordered transactions; pre-processing the reordered transactions to obtain preprocessed transactions compatible for replaying; and replaying the preprocessed transactions onto a target database server; wherein the captured transactions are reordered based on TCP header/footer information; wherein the reordered transactions are pre-processed based on multiple parameters selected from a group comprising Target server IP/Ports, Target server user passwords, Replay Start Point, Session Level Filters, Compression Rate, Target Server Service Name, SSL Replay Session Level Filters, and Query Level Filters and database commit dependency to obtain transactions compatible for replaying.

Accordingly, the present invention provides a system for generating database transactions compatible for replaying, said system comprising: an IO capturing sub-system, communicatively coupled with a source database server and being configured to monitor data transmitted to/received from the source database server; and extract transactions from the data thus monitored and store the extracted transactions; a TCP reordering sub-system, communicatively coupled with the IO capturing sub-system and being configured to reorder the extracted transactions thus stored based on TCP header/footer information to obtain reordered transactions; and a pre-processing sub-system, communicatively coupled with the TCP reordering sub-system and being configured to pre-process the reordered transactions based on multiple configuration parameters selected from a group comprising Target server IP/Ports, Target server user passwords, Replay Start Point, Session Level Filters, Compression Rate, Target Server Service Name, SSL Replay Session Level Filters, and Query Level Filters and database commit dependency to obtain pre-processed transactions compatible for replaying.

Further, the present invention provides a system for replaying database transactions, said system comprising: a re-mapping component, being configured to remap configuration and run-time parameters of a target database server with the respective parameters of a source database server, said parameters include but not limited to Server capabilities, Login password, Server service name, SQL cursor IDs, Large Object (LOB) descriptors, ROWIDs; and a replay scheduler, being configured to read and execute database transactions, wherein the said database transactions thus read and replayed are based on database transactions that occurred on the source database server and that have been reordered based on TCP header/footer information and pre-processed based on multiple configuration parameters selected from a group comprising Target server IP/Ports, Target server user passwords, Replay Start Point, Session Level Filters, Compression Rate, Target Server Service Name, SSL Replay Session Level Filters, and Query Level Filters and database commit dependency.

Furthermore, the present invention provides a system for replaying database transactions of a source database server onto a target database server, said system comprising: an IO capturing subsystem, communicatively coupled to the source database server and being configured to capture and store the database transactions transmitted to/received from the source database server; a TCP reordering subsystem, communicatively coupled to the IO capturing subsystem and being configured to receive the captured database transactions and reorder the said transactions; a pre-processing subsystem, communicatively coupled with the TCP reordering sub-system and being configured to pre-process the reordered transactions; and a replay subsystem, communicatively coupled to the target database server and being configured to receive the preprocessed transactions from the said pre-processing sub-system and replay the preprocessed transactions thus received; wherein, the TCP reordering subsystem is being configured to reorder the captured transactions based on TCP header/footer information; wherein the pre-processing sub-system is being configured to pre-process the reordered transactions based on multiple parameters selected from a group comprising Target server IP/Ports, Target server user passwords, Replay Start Point, Session Level Filters, Compression Rate, Target Server Service Name, SSL Replay Session Level Filters, and Query Level Filters and database commit dependency to obtain transactions compatible for replaying.

Accordingly, the present invention relates to a computer-readable medium comprising instructions, which, when executed by a computer system, cause the system to perform operations, the instructions comprising: monitoring data transmitted to/received from a source database server; extracting transactions from the data thus monitored and storing the extracted transactions; reordering the extracted transactions thus stored based on TCP header/footer information to obtain reordered transactions; and pre-processing the reordered transactions based on multiple configuration parameters selected from a group comprising Target server IP/Ports, Target server user passwords, Replay Start Point, Session Level Filters, Compression Rate, Target Server Service Name, SSL Replay Session Level Filters, and Query Level Filters and database commit dependency to generate pre-processed database transactions compatible for replaying.

Further, the present invention relates to a computer-readable medium comprising instructions, which, when executed by a computer system, cause the system to perform operations, the instructions comprising: re-mapping configuration and run time parameters of a target database server with the respective parameters of a source database server, said parameters include but not limited to Server capabilities, Login password, Server service name, SQL cursor IDs, Large Object (LOB) descriptors, ROWIDs; and reading and replaying database transactions onto the target database server, wherein the said database transactions thus read and replayed are based on database transactions that occurred on the source database server and that have been reordered based on TCP header/footer information and pre-processed based on multiple configuration parameters selected from a group comprising Target server IP/Ports, Target server user passwords, Replay Start Point, Session Level Filters, Compression Rate, Target Server Service Name, SSL Replay Session Level Filters, and Query Level Filters and database commit dependency.

Furthermore, the present invention relates to a computer-readable medium comprising instructions, which, when executed by a computer system, cause the system to perform operations, the instructions comprising: capturing database transactions occurring on a source database server and storing the captured transactions; reordering the captured transactions to obtain reordered transactions; pre-processing the reordered transactions to obtain preprocessed transactions compatible for replaying; and replaying the preprocessed transactions onto a target database server; wherein the captured transactions are reordered based on TCP header/footer information; wherein the reordered transactions are pre-processed based on multiple parameters selected from a group comprising Target server IP/Ports, Target server user passwords, Replay Start Point, Session Level Filters, Compression Rate, Target Server Service Name, SSL Replay Session Level Filters, and Query Level Filters and database commit dependency to obtain transactions compatible for replaying.

BRIEF DESCRIPTION OF THE DRAWINGS

The invention itself, together with further features and attended advantages, will become apparent from consideration of the following detailed description, taken in conjunction with the accompanying drawings. One or more embodiments of the present invention are now described, by way of example only, with reference to the accompanied drawings wherein like reference numerals represent like elements and in which.

DETAILED DESCRIPTION

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternative falling within the spirit and the scope of the invention.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present invention relates to a method for generating database transactions compatible for replaying, said method comprising: monitoring data transmitted to/received from a source database server; extracting transactions from the data thus monitored and storing the extracted transactions; reordering the extracted transactions thus stored based on TCP header/footer information to obtain reordered transactions; and pre-processing the reordered transactions based on multiple configuration parameters selected from a group comprising Target server IP/Ports, Target server user passwords, Replay Start Point, Session Level Filters, Compression Rate, Target Server Service Name, SSL Replay Session Level Filters, and Query Level Filters and database commit dependency to generate pre-processed database transactions compatible for replaying.

In one aspect of the present invention, said extracting includes extracting transactions along with TCP header/footer information from the data communicated through TCP/IP protocol and captured through IO Capture.

In another aspect of the present invention, said extracting includes extracting transactions from the data communicated through Inter Process Communication protocol and prepending dummy headers and dummy TCP sequence numbers to the transactions thus extracted.

In one aspect of the present invention, said reordering includes: determining TCP sequence number and time stamp of each of the transactions thus captured; and reordering the transactions if the sequence number or the time stamp thus determined are out of order.

In one aspect of the present invention, said pre-processing includes: analyzing multiple configuration parameters of the reordered transactions; detecting commit dependant transactions among the reordered transactions; rescheduling the transactions based on the commit dependency of the transactions to obtain preprocessed transactions compatible for replaying.

In addition, the present invention relates to a method for replaying database transactions, said method comprising: re-mapping configuration and run-time parameters of a target database server with the respective parameters of a source database server, said parameters include but not limited to Server capabilities, Login passwords, Server service names, SQL cursor IDs, Large Object (LOB) descriptors, ROWIDs; and reading and replaying database transactions onto the target database server, wherein the said database transactions thus read and replayed are based on database transactions that occurred on the source database server and that have been reordered based on TCP header/footer information and pre-processed based on multiple configuration parameters selected from a group comprising Target server IP/Ports, Target server user passwords, Replay Start Point, Session Level Filters, Compression Rate, Target Server Service Name, SSL Replay Session Level Filters, and Query Level Filters and database commit dependency.

In one aspect of the present invention, wherein remapping includes: reconciling Character set differences during the replay of Mainframe database transactions onto a Non-Mainframe machine.

In one aspect of the present invention, the method further comprising monitoring the performance of the target database server and generating reports based on the same.

In one aspect of the present invention, said monitoring and generating comprises monitoring data transmitted to/received from the target database server; extracting transactions from the data thus monitored and storing the extracted transactions; comparing transactions occurred at the source database server with the extracted transactions of the target database server; and generating reports based on the comparison.

Further, the present invention relates to a method for replaying database transactions, said method comprising: capturing database transactions occurring on a source database server and storing the captured transactions; reordering the captured transactions to obtain reordered transactions; pre-processing the reordered transactions to obtain preprocessed transactions compatible for replaying; and replaying the preprocessed transactions onto a target database server; wherein the captured transactions are reordered based on TCP header/footer information; wherein the reordered transactions are pre-processed based on multiple parameters selected from a group comprising Target server IP/Ports, Target server user passwords, Replay Start Point, Session Level Filters, Compression Rate, Target Server Service Name, SSL Replay Session Level Filters, and Query Level Filters and database commit dependency to obtain transactions compatible for replaying.

In one aspect of the present invention, said pre-processing includes analyzing multiple configuration parameters, detecting commit dependant transactions, rescheduling the detected transactions based on commit dependency of the transactions to generate preprocessed transactions compatible for replaying.

In another aspect of the present invention, the method further comprising: monitoring the performance of the target database server; and generating reports based on the comparison of performance of the source database server with the target database server.

Accordingly, the present invention relates to a system for generating database transactions compatible for replaying, said system comprising: an IO capturing sub-system, communicatively coupled with a source database server and being configured to monitor data transmitted to/received from the source database server; and extract transactions from the data thus monitored and store the extracted transactions; a TCP reordering sub-system, communicatively coupled with the IO capturing sub-system and being configured to reorder the extracted transactions thus stored based on TCP header/footer information to obtain reordered transactions; and a pre-processing sub-system, communicatively coupled with the TCP reordering sub-system and being configured to pre-process the reordered transactions based on multiple configuration parameters selected from a group comprising Target server IP/Ports, Target server user passwords, Replay Start Point, Session Level Filters, Compression Rate, Target Server Service Name, SSL Replay Session Level Filters, and Query Level Filters and database commit dependency to obtain pre-processed transactions compatible for replaying.

In one aspect of the present invention, said IO capturing subsystem is a network capture subsystem located in a remote server.

In another aspect of the present invention, said IO capturing subsystem is a kernel capture subsystem located in a source database server.

In addition, the present invention relates to a system for replaying database transactions, said system comprising: a re-mapping component, being configured to remap configuration and run-time parameters of a target database server with the respective parameters of a source database server, said parameters include but not limited to Server capabilities, Login password, Server service name, SQL cursor IDs, Large Object (LOB) descriptors, ROWIDs; and a replay scheduler, being configured to read and execute database transactions, wherein the said database transactions thus read and replayed are based on database transactions that occurred on the source database server and that have been reordered based on TCP header/footer information and pre-processed based on multiple configuration parameters selected from a group comprising Target server IP/Ports, Target server user passwords, Replay Start Point, Session Level Filters, Compression Rate, Target Server Service Name, SSL Replay Session Level Filters, and Query Level Filters and database commit dependency.

In one aspect of the present invention, the system further comprising a Character set mapping system configured to reconcile Character set differences during the replay of Mainframe database transactions onto a Non-Mainframe machine.

In one aspect of the present invention, the system further comprising a reporting subsystem communicatively coupled with the target database server, and being configured to monitor the performance of the target database server and generate reports based on the same.

Furthermore, the present invention relates to a system for replaying database transactions of a source database server onto a target database server, said system comprising: an IO capturing subsystem, communicatively coupled to the source database server and being configured to capture and store the database transactions transmitted to/received from the source database server; a TCP reordering subsystem, communicatively coupled to the IO capturing subsystem and being configured to receive the captured database transactions and reorder the said transactions; a pre-processing subsystem, communicatively coupled with the TCP reordering sub-system and being configured to pre-process the reordered transactions; and a replay subsystem, communicatively coupled to the target database server and being configured to receive the preprocessed transactions from the said pre-processing subsystem and replay the preprocessed transactions thus received; wherein, the TCP reordering subsystem is being configured to reorder the captured transactions based on TCP header/footer information; wherein the pre-processing subsystem is being configured to pre-process the reordered transactions based on multiple parameters selected from a group comprising Target server IP/Ports, Target server user passwords, Replay Start Point, Session Level Filters, Compression Rate, Target Server Service Name, SSL Replay Session Level Filters, and Query Level Filters and database commit dependency to obtain transactions compatible for replaying.

In one aspect of the present invention, said IO capturing subsystem comprises a Network capture device, being configured to capture the transactions communicated through TCP/IP protocol.

In another aspect of the present invention, said IO capturing subsystem comprises a Kernel Capture device, being configured to capture the transactions communicated through Inter Process Communication (IPC).

In one aspect of the present invention, said TCP reordering subsystem is configured to: determine TCP sequence number and time stamp of each of the transactions thus captured; and reorder the transactions if the sequence number or the time stamp thus determined is out of order.

In yet another aspect of the present invention, the system further comprising a Reporting subsystem configured to monitor the performance of the target database server and to generate a report based on comparison of the performance of the source database server and the target database server.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following description is, therefore, not to be taken in a limiting sense.

Figure 1:
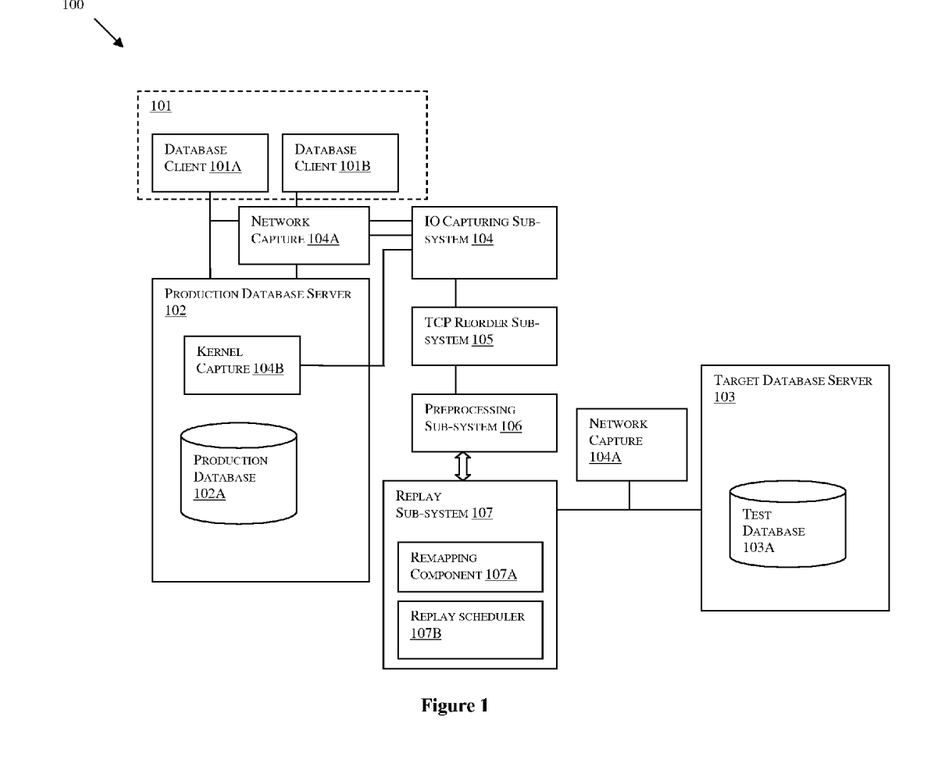
FIG. 1 is a block diagram illustrating a system for capturing database workload and replaying the same in accordance with an embodiment of the present invention.

FIG. 1 is a block diagram illustrating a system for capturing database workload and replaying the same in accordance with an embodiment of the present invention.

The system (100) as shown in FIG. 1 may be a dedicated set of hardware or merely a collection of resources from within one or more other systems. Further, the system has several components shown as separate entities, but may actually consists of several different functions of one entity, and any combination in between.

In one embodiment, the system (100) comprises of one or more database clients 101A, 101B . . . and so on (commonly referred to as database client 101) communicatively connected to a production/source database server (102) via a network. The system is configured to capture the workload on the source database server (102) and replay the same workload onto a target database server (103) to determine whether the difference between the performance of the source database server (102) and the target database server (103) is a permissible or desirable difference.

The database client (101) includes a desktop personal computer, workstation, laptop, PDA, cell phone, or any WAP-enabled device or any other computing device capable of interfacing directly or indirectly to the Internet or other network connection. The database client typically includes one or more user interface devices, such as a keyboard, a mouse, touch screen, pen or the like, for interacting with the GUI provided on a display. The database client also includes a graphical user interface (GUI) provided therein for interacting with the database server to access data and to view generated reports.

The network can be a LAN (local area network), WAN (wide area network), wireless network, point-to-point network, or other configuration. One of the most common types of network in current use is a TCP/IP (Transfer Control Protocol and Internet Protocol) network for communication between database client and database server. Other common Internet protocols used for such communication include HTTP, FTP, AFS, and WAP etc.

The source database server (102) includes a includes a desktop personal computer, workstation, laptop, PDA, cell phone, or any WAP-enabled device or any other computing device capable of interfacing directly or indirectly to the Internet or other network connection. The database server may include at least one processor with associated system memory, which may store, for example one or more databases. The system may further include additional memory, which may, for example, include instructions to perform various operations. The system memory and other memory may comprise separate memory devices, a single shared memory device or a combination of separate and shared memory devices. The database server typically includes one or more user interface devices, such as a keyboard, a mouse, touch screen, pen or the like, for interacting with the GUI provided on a display. The memory of the source database server includes a production database (102A) for storing transactions, and data related to transactions.

The target database server (103) also interchangeably referred to as test database server (103), includes a includes a desktop personal computer, workstation, laptop, PDA, cell phone, or any WAP-enabled device or any other computing device capable of interfacing directly or indirectly to the Internet or other network connection. The database server may include at least one processor with associated system memory, which may store, for example one or more databases. The system may further include additional memory, which may, for example, include instructions to perform various operations. The system memory and other memory may comprise separate memory devices, a single shared memory device or a combination of separate and shared memory devices. The database server typically includes one or more user interface devices, such as a keyboard, a mouse, touch screen, pen or the like, for interacting with the GUI provided on a display. The memory of the target database server includes a target database (103A) for storing transactions, and data related to transactions.

The target database server (103) may be different in one or more respects from production database server (102). In one embodiment, the test database server (103) might be an upgraded version of the production database server (102). In another embodiment, the test database server (103) may be the same brand and version of production database server (102), but the test database server (103) might be configured differently in one or more settings from the production database server (102). Test database server (103) might execute on a machine that has different hardware than the hardware of the machine on which production database server (102) executes. Test database server (103) might execute in conjunction with a different operating system than the operating system in conjunction with which production database server (102) executes. The purpose of subjecting test database server (103) to the same workload as that to which production database server (102) was actually subjected may be able to determine whether the difference between test database server (103) and production database server (102) and/or the difference in the environments in which those database servers execute is a permissible or desirable difference.

In one embodiment, there is one instance of the production database server and one instance of the test database server. However, in alternative embodiments of the invention, there may be multiple production database server instances, all of which perform database operations relative to production database 102A. Additionally, in alternative embodiments of the invention, there may be multiple test database server instances, all of which perform database relative to test database 103A. In one embodiment of the invention, the number of production database server instances differs from the number of test database server instances.

Test database (103A) may be different in one or more respects from production database (102A). For example, the manner in which logical relational database structures are physically laid out and stored on disk in test database (103A) might differ from the manner in such logical relational database structures are physically laid out and stored on disk in production database (102A). Thus, although the values present in the data that is stored in the production database (102A) will be the same as the values present in the data that is stored in the test database (103A), the manner in which those values are stored on disk may differ between the two databases. The purpose of subjecting test database server (103) to the same workload as that to which production database server (102) actually was subjected may be to determine whether the difference between test database (103A) and production database (102A) is a permissible or desirable difference. Typically, test database (103A) is not merely a backup, minor or fail-over of production database (102A).

Further, the system comprises an IO capturing subsystem (104), is a desktop personal computer, workstation, laptop, PDA, cell phone, or any WAP-enabled device or any other computing device capable of interfacing directly or indirectly to the Internet or other network connection. The IO capturing subsystem (104) typically includes one or more user interface devices, such as a keyboard, a mouse, touch screen, pen or the like, for interacting with the GUI provided on a display. The IO capturing subsystem is configured to capture the database workload of the production database server (102). The IO capturing subsystem is implemented as a standalone system or as a part of the production database server.

In one embodiment, the IO capturing subsystem (104) is a network capture device (104A) communicatively coupled with the database clients 101 being configured to capture the workload. For example, the network capture device (104A) is any Network capturing tools or Network taps existing in the art. The network capturing tools may reside in a remote host to capture the workload using Switch Port Mirroring for capturing and writing the transactions in a pcap Network capture format which is a open file format used by Network capture applications like 'tcpdump'. In another embodiment, the IO capturing system is a Kernel Capture driver (104B) residing in the production database server. The Kernel Capture driver (104B) is configured to listen to the network traffic or Inter Process Communication (IPC) traffic. A user level application of the Kernel capture driver is configured to write the traffic thus captured into pcap network capture format.

The system (100) further comprises a TCP reordering subsystem (105) communicatively coupled with the IO capturing subsystem (103) and configured to reorder the transactions thus captured by the IO capturing subsystem. The TCP reordering subsystem (105) is a desktop personal computer, workstation, laptop, PDA, cell phone, or any WAP-enabled device or any other computing device capable of interfacing directly or indirectly to the Internet or other network connection. The TCP reordering subsystem (105) typically includes one or more user interface devices, such as a keyboard, a mouse, touch screen, pen or the like, for interacting with the GUI provided on a display. The TCP reordering subsystem (105) is configured to reorder the workload or transactions captured across multiple client connections and multiple based on TCP/IP information of the transactions.

Further, the system (100) comprises a Pre-processing subsystem (106) which is communicatively coupled with the TCP reordering system. The pre-processing subsystem (106) is a desktop personal computer, workstation, laptop, PDA, cell phone, or any WAP-enabled device or any other computing device capable of interfacing directly or indirectly to the Internet or other network connection. The pre-processing subsystem (106) typically includes one or more user interface devices, such as a keyboard, a mouse, touch screen, pen or the like, for interacting with the GUI provided on a display. The pre-processing subsystem (106) is configured to analyze the transactions thus reordered based on multiple configuration parameters in order to obtain preprocessed transactions compatible for replaying.

The reordered transactions are then replayed by a replay system (107) communicatively coupled with the target or test database server (103). The replay subsystem (107) is a desktop personal computer, workstation, laptop, PDA, cell phone, or any WAP-enabled device or any other computing device capable of interfacing directly or indirectly to the Internet or other network connection. The replay subsystem (107) typically includes one or more user interface devices, such as a keyboard, a mouse, touch screen, pen or the like, for interacting with the GUI provided on a display. The replay system (107) is configured to replay the preprocessed transactions in the same order as it was played to the source database server (102). The replay system (107) is also configured to validate the target Server Responses during the replay of Mainframe Database traffic onto non-Mainframe machines by reconciling the Character set differences encountered in the server responses, as Mainframes use a default character set of EBCDIC and non-Mainframe may use ASCII character set. In one embodiment, the replay system (107) further comprises a Character set mapping system configured to reconcile Character set differences during the replay of Mainframe database transactions onto a Non-Mainframe machine.

The system (100) optionally comprises a reporting system configured to monitor the performance of the test database server and generate reports for the same. The reporting system may be present within the target database server or may be present as a standalone system in a remote machine.

Figure 2:
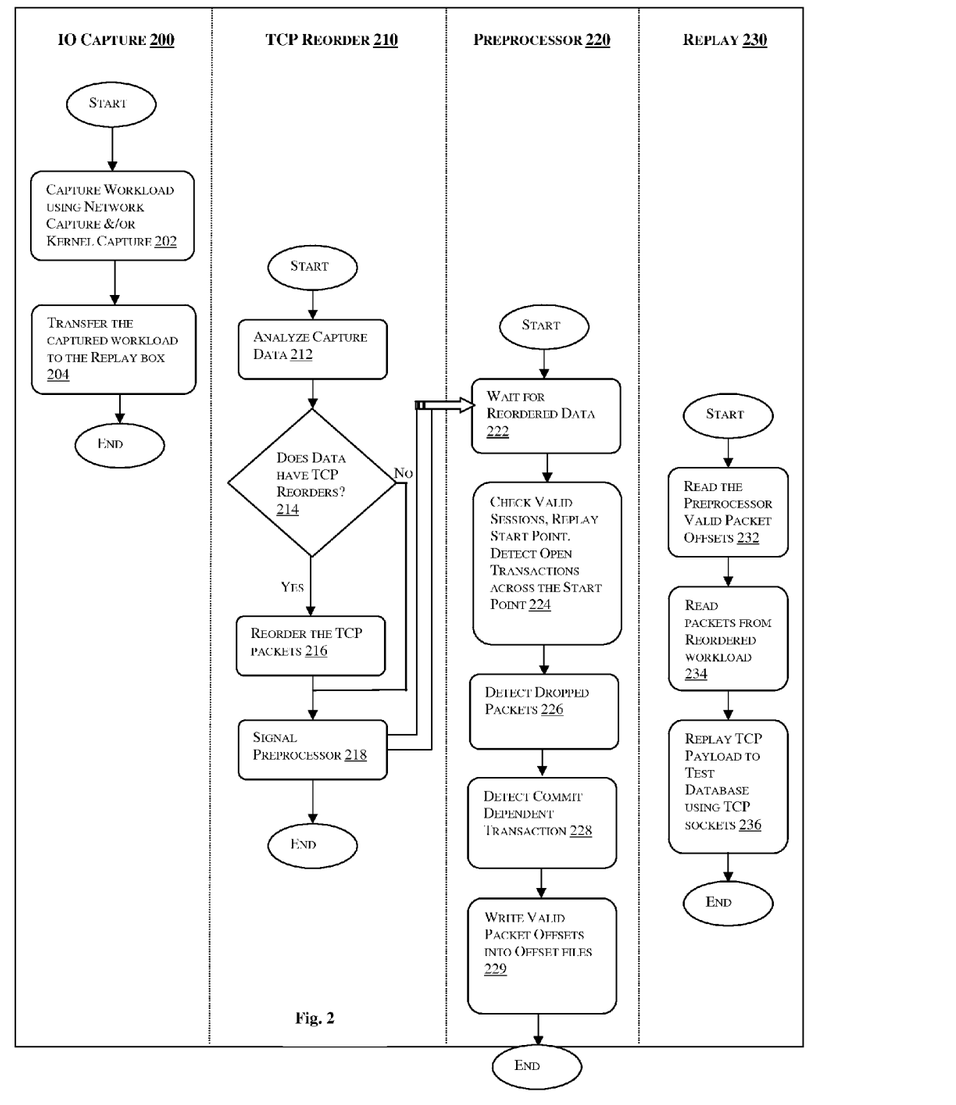
FIG. 2 is a flow chart of a method for replaying database workload in accordance with an embodiment of the present invention.

FIG. 2 is a flow chart of a method for replaying transactions in accordance with an embodiment of the present invention.

The flow chart, as shown in FIG. 2, relates to a method of capturing and replaying production workload onto a test database server. The method for Replaying production scale traffic of various databases such as Sybase™, DB2™, Informix™, etc. with the source database server workload captured using network traffic capture or using Kernel Capture modules is described below. The method includes four stages such as IO capture (200), TCP Reorder (210), Preprocessor (220) and Replay (230). Each of the stages is explained in detail in the following paragraphs.

At block (202), the method performs capturing of Source Database workload i.e., capturing traffic to/from the source database of the source database server (102). The term 'IO Capture' referred henceforth will imply either Network Traffic capture or Kernel based Capturing or both. The IO capturing subsystem monitors the data transmitted from/received to the source database server (102) and extracts transactions from the monitored data.

Capturing (202) Production Workload Using Network Capture Device 104A

The method performs capturing of Source Database workload using Network Capture device 104A. In one embodiment, database Clients (101) typically connect to the Production Database Server (102) using TCP/IP protocol. The communication between the client(s) (101) and the server (102) is in the form of Network Packets. Each packet comprises workload of the source database server embedded as packets along with TCP/IP header/footer information. Workload includes for example, requests originating from one of the database clients (101), or one of the database servers, or some other process that is external to the production database server (102).

The communication channel traffic/workload can be captured using Network Capture device 104A. In one aspect, the communication channel traffic/workload is duplicated using Network Switch Port Mirrors (SPAN Ports) or using Network Taps (102C) and the duplicated traffic is routed to the capture device 104A. The capture device 104A includes a capture process which saves the Network Traffic in an open protocol 'pcap' file format onto disk. Typical Network capture tools (for e.g. 'tcpdump') use 'pcap' format to save the captured network traffic. The capture device can also be a dedicated Network Capture Appliance which uses Network Traffic 'Stream to Disk' technologies to capture very high traffic throughputs.

In case of using Network TAP or a Switch Port Minor, changes to the network configuration are required. In cases where such changes are not feasible, the Network Capture can take place directly on the Database host. In such a scenario, user may configure the capture to take place directly onto a local Disk File System on the production host itself, or use the facility of simultaneous capture and transfer, wherein, small chunks of production workload are captured and transferred to a remote host where real time amalgamation of the workload happens whilst the capture is going on. The local host capture process listens to Network Traffic on user specified Network Interface Cards or Loop back devices and writes the captured network traffic in chunks so as to optimize local disk writes.

The Capture process is Protocol Independent. The same Capture process can capture traffic from a variety of Databases such as Sybase™, DB2™, Informix™, etc. The Capture process records the entire TCP/IP transactions across multiple TCP Sessions. The captured data may not be completely time sorted. Also, in case of larger throughputs, the capture may have some packet drops.

In one embodiment, multiple Captures can also be initiated if it is not feasible to capture from one source only. In such a case, during the 'TCP Reorder' phase, all capture files are merged based on time stamps, to create a consolidated network capture.

The benefit of using Network Capture is that no Database connections need to be established for the purpose of the capture. Also, in case of Remote capture (using Switch Port Mirrors or Network Taps), the Database host experiences 0% load, since no part of the capturing occurs on the host. In case of Local capture, the lightweight capture process ensures that only 3-5% CPU utilization occurs. In case of long running Database Client connections, it may not be feasible to keep the entire workload capture running throughout the lifetime of the connection. For example, Application Servers may be connecting to the Database Server and the connections may be active for months on end.

In one embodiment, if the entire workload capture is enabled, the amount of disk space required would be huge. For such scenarios, a process known as 'Login Capture' could be used wherein only the initial network traffic of each TCP connection is written to disk. The complete capture process can then be started at any time later. The Pre-Processing subsystem (106) will then reconcile the Logins captured with the complete capture data.

Capturing (202) Production Workload Using Kernel Capture Driver 104B

In another embodiment, a Network Capture (104A) based approach is not feasible for capturing the production workload. For example, in case the workload is being run on Operating Systems like Solaris or HPUX under loop back (i.e. where the traffic is initiated on the same machine as the database server). Under Solaris (up to Solaris version 10) and HPUX, loop back traffic capture cannot be used using network capture techniques and necessitates the use of dedicated Kernel modules and therefore, the workload is captured through Kernel Capture driver 104B. In some cases the traffic is so high that a Network capture based approach could result in significant packet drops warranting the use of a Kernel Module to minimize packet drops. Also, if the traffic is being sent, not using TCP/IP, but using Inter Process Communication (IPC), such as using Shared Memory (on UNIX based systems), a Network Capture will not be able to capture the workload.

Under such circumstances, the Production Workload capture is done using a Kernel Capture driver (104B). The Kernel capture driver (104B) will receive the traffic to/from the production database in the payload format itself, i.e. without the complete TCP or IP headers. The user space application interacting with the Kernel driver will prepend dummy Ethernet, IP and TCP headers to this payload. The user space application will also generate dummy TCP sequence numbers which would also take into consideration packet drops, if any, and write the payload in a pcap file format.

In one aspect, for Solaris or HPUX Kernel based capture, the Kernel capture driver (104B) is configured either between the TCP and IP Layers or between the TCP and Socket Layers. A local capture application is configured to open a capture queue to the Kernel driver and receive the loop back workload. This workload is then written to a local file in the pcap Network capture file format.

In case of IPC traffic capture (using Shared Memory and semaphores), the Kernel capture driver (104B) is configured to capture Shared Memory and Semaphore related system calls using System call Hooking techniques and read the shared memory into a local buffer queue. This queue is also simultaneously read by a Memory Mapped capture application which will write the captured data in the pcap Network capture file format. The user space application writing the captured data to disk will try to optimize disk writes by writing data in chunks.

After the Capture device has captured the production workload, the next stage involves 'TCP Reordering' (210) of the workload. 'TCP Reordering' (210) occurs on the Replay Server machine (107) which could either be the same machine used for the 'IO Capture' or a different machine, in which case the captured workload needs to be moved to the new machine. In such cases, the captured workload is transferred (204) to the replay subsystem (107) and such transfer is performed as an offline step and does not require any Database/Application Server connections.

'TCP Reordering' (210) of the Captured Workload

The next stage after the IO capture stage (200) is the TCP reorder stage (210) wherein the captured workload is reordered.

In one embodiment, Network capture of the production server workload may result in TCP reorders whereby the capture device may have captured the response packet from the server prior to the original request packet from the client if the time difference between the request and response packet was miniscule. In such cases, reordering of the captured workload i.e., the transactions is performed to result in workload which is time aligned and TCP aligned. In an aspect where multiple 'IO Capture' subsystems were involved in capturing the Source Production workload, the 'TCP Reordering' subsystem will also merge the different pcap files created by each individual 'IO Capture' subsystem.

At block (212), the captured data is analyzed i.e., using the TCP sequence numbers. In one embodiment, the TCP alignment is performed using the concept of TCP Sequence numbers. Each TCP packet has a Sequence Number associated with the packet to indicate the number of bytes associated with that connection from the start of the connection. Using TCP Sequence numbers, TCP reorders as well as TCP Packet Drops can be identified.

At block (214), it is determined as to whether there are any requirements of TCP reordering or TCP alignment. In one embodiment, if it is determined that the captured data requires TCP reorders, then the method proceeds to block (216) (i.e., "YES" path). In case of TCP reorders, the Sequence numbers would be out of order, wherein, a higher sequence number would be present before a lower sequence number. For TCP Packet Drops, a chunk of sequence numbers (equal to the bytes missing) would be missing from the workload. In another embodiment, if it is determined that the captured data do not require TCP reorders, then the method proceeds to block (218) (i.e., "NO" path).

At block (216), the TCP packets are reordered. In one embodiment, if it is determined that the captured data requires TCP reorder and TCP alignment i.e., "YES" path, then the reordering of the packets takes place. The 'TCP Reordering subsystem (105) will create a new consolidated TCP Reordered workload pcap file containing TCP reordered transactions to be used for subsequent Pre-Processing, Replay and Analytics.

At block (218), the method proceeds to the next stage i.e., the Preprocessor stage (220) on reordering the transactions. In one embodiment, if it is determined that the TCP reordering is not required to be performed on the captured data, then the method proceeds through "NO" path to signal the preprocessor and to initiate the preprocessing stage (220). In another embodiment, the method proceeds from block (216) on completion of reordering of the TCP packets to the block (218) for triggering the preprocessor stage (220).

Pre-Processing (220) of the TCP Reordered Captured Workload

The next stage, Pre-Processor (220) involves taking in User Specified Replay Configuration Parameters and creating Data Structures to be used for subsequent replays.

At block (222), the reordered data is received after waiting for the same. In one embodiment, the preprocessing subsystem (106) waits for a period of time to receive the reordered data from the TCP reordering subsystem (105).

At block (224), the reordered data thus received is analyzed based on different configuration options. In one embodiment, the options include: Target Server IP/Ports, Target server user passwords, Replay Start Point, Session Level Filters, Compression Rate, Target Server Service Name, SSL Replay Session Level Filters, and Query Level Filters etc. This stage requires in-depth knowledge of the Transport Protocol used by the database client-server TCP communication. Target Server IP/Ports as input are needed since the Test Server to be used for the replay may be different from the Source Production Server. Target server user passwords as input are needed since; the Test server passwords may need to be set by an administrator and not by individual users. Compression Rate indicates whether the Replay should be fired with the same delay between a response and the subsequent request within a single connection. It indicates the amount of 'white space' per TCP session required.

Replay Start Point can be specified as the Start of the pcap itself, or a 'Point in Time' or the basis of a Database backup (for a Database Replay). If a Point in time is specified, the preprocessor will skip till that time within the workload. If a Database backup is specified, then the Pre-processor will search for the database backup command within the pcap file and will set the Replay Start point to the point where the server response indicates a Database Checkpoint has occurred.

The Pre-processor will also reconcile data available from Login Captures if they were used. The result of the Pre-Processing stage (220) is a set of files containing data structures which the Replay process can subsequently use for a quick lookup and mapping.

In Databases, once a database backup image is restored, all non-committed running transactions (incomplete transactions) across the Restore Point are rolled back (dropped). During Replay if these rolled back transactions are not fired again, it would result in missing out some transactions which were initiated before the backup but are still not complete (Committed).

The Pre-Processor analyzes all transactions from the start of the pcap and all such incomplete transactions across each open client connection are scheduled for replay as well. Transactions such as Cursor Declares, Database Changes, and Session Configuration Changes occurring before the Replay Start Point are also scheduled for Replay. For example, if any Cursors are active across the Replay Start point, that particular Cursor Declare statement should be scheduled for Replay even though it occurred before the Replay Start Point. All transactions after the Replay Start Point are also scheduled for Replay.

In one embodiment, if Session Level Filters are enabled, such as Filters based on Client username, Application Name, IP addresses, such sessions matching the filters are excluded from the replay.

In one embodiment, if SSL Replay Session Level Filters are enabled, individual sessions matching the filters would be SSL encrypted during the Replay. These sessions need not have been SSL encrypted during the Source run.

In one embodiment, if Query Level Filters are set, specific SQLs matching the filters may be skipped or modified, configured, during the Replay.

In one embodiment, the Pre-processor will also create a baseline for each SQL observed in the pcap; the baseline consisting of statistics such as Server Response Times, Error Codes, and Bytes Returned. The baselines for different SQLs are consolidated at the end of the Pre-processing stage so as to combine statistics of different occurrences of the same SQL. This baseline may be subsequently used during the Replay to find SQLs which are executing slower.

At block (226), dropped packets are detected. In one embodiment, the Pre-Processor stage (220) also checks for the validity of the capture as too many dropped packets may result in that particular TCP session being removed from the Replay list.

At block (228), commit dependant transactions are determined. In one embodiment, the Pre-Processor stage (220) is configured to detect potential Database Commit Dependent Transactions for a finer Inter Session Synchronization handling during the Replay phase. The Pre-Processing subsystem (106) is configured to determine transactions across multiple sessions which are Started within a few milliseconds of each other.
Where the Server response of one transaction is seen after a 'Commit Response' of another transaction of some other session. In other words, the Server response to one of the requests came in only after a Commit was sent from another session and the Commit was responded to. The use of Commit is because after a commit, locks held by that client connection would be released.

Using such Potential Commit Dependent Transactions, the Replay subsystem (107) may schedule queries across multiple sessions which may be time misaligned as well. This may be used for queries which were seen very close to each other during the Original Workload.

At block 229, valid packet offsets into offsets files are written on to the preprocessed pcap file. In one embodiment, the preprocessed transactions are written into valid packets with offsets being written onto offset files thereby generating preprocessed transactions compatible for replaying. Such preprocessed transactions are then be replayed multiple times in the replay stage (230).

Replay (230) of the Captured Workload

After Pre-Processing of the Original Workload is completed, the replay can be initiated.

Before the replay is started, the Target Test Database is restored with username passwords changed as per the password list provided in the Pre-Processing configuration. If the Original Workload contains Time Dependent Queries, the Test database machine local time may be changed to the same time.

The Test Database can have differences compared to the Original Database configuration. The Test Database can be of a higher version (for tests related to Database Upgrades) or it may have differences in configuration, for e.g. to test out Index changes. The Test Database may be on a box with a different hardware &/or Processor configuration or with a different OS. The only restriction being that the Test Database needs to be of the same database protocol as the original (for e.g. Sybase™ ASE to Sybase™ ASE).

To compare the Replay Workload to the Original workload by the 'Reporting' subsystem, the 'IO Capture' of the Replay Workload needs to be initiated. The Replay 'IO capture' can either be started directly on the Replay Server box or on the Test Database box.

At blocks (232, 234), the preprocessed valid packet offsets and valid packets are read from the reordered workload. In one embodiment, the Replay process (230) uses the pcap file containing the Original Workload and Pre-Processing Data structures as input. The Replay process fires TCP socket level communication messages to the Test Database using the raw Network Capture information available in the pcap file. In other words, the Replay process extracts the TCP payload data from the Network Capture Frame and replays that payload using TCP socket send system calls. This results in the Test Database receiving queries in the same format using the same client library semantics as was originally observed. Oracle DBReplay on the other hand, fires all the captured traffic using a single client library format, thus missing out on potential issues which could occur when traffic from different client libraries are encountered.

There may be one or more Replay processes on the same Replay box connecting to the Target Test Server. Each Replay process may be multi-threaded with each thread handling one or more concurrent client sessions. Thus a single Replay box, with one or more Replay processes, is sufficient to fire the entire Production Level Traffic onto a Test System. The Replay process does not link with any Database Client Libraries and uses Database Transport Protocol knowledge instead.

At block 236, the TCP payload is subjected or replayed at the target database server. In one embodiment, the Replay process subjects the Test Server to the same workload as was originally fired. The target server would have no knowledge of the Replay being fired as the input queries to the target server are in the same format as was present in the original workload. To the target Server, it would appear that the input traffic is coming from the same Logins, Client Applications, and Client Libraries as were seen in the Original Production Workload. The Captured workload may contain SQL, non-SQL, background process, User Defined Types as supported by various Databases.

The Replay stage (230) needs to have in-depth knowledge of the Transport Protocol (using TCP/IP) used by the Databases supported. The Replay process also needs to know various Transport Protocol versions used by a specific Database such as TDS versions 4 and 5 for Sybase ASE, DRDA and SQLI for Informix.

Real Time Replay Re-Mapping for Replay Consistency:

In the replay stage (230), remapping of the configuration of the target database server with that of the source database server is performed by the remapping component 107A. In one embodiment, the Replay process substitutes the password seen for each Original Workload Client session Login with the new password configured. In another embodiment, the Replay process stores a mapping of the Target Server Capabilities returned from the Login Response with the Source Server Login Capabilities. This may be used for protocol related substitution, for e.g. there may be differences in packets sizes negotiated during the replay compared to the source, or there could be different capabilities available in the Target compared to the Source.

In yet another embodiment, the replay process may also need to substitute the Original Server Service Name with the user configured Service Name during authentication. The Replay process may create a mapping of SQL cursor IDs. A cursor ID may be returned by the Database server as a SQL identifier. The Replay process may use this mapping to substitute the original workload cursor number while replaying. The Replay process may also create a mapping of Large Object (LOB) descriptors. These descriptors may be part of Server Responses and may be re-used later by Client Sessions.

In still another embodiment, the Replay process may also create a mapping of ROWIDs returned by the Target compared to the source. The Replay process may track the Processor configuration of the Target and the Original Database machines. This may be used for swapping specific fields while sending Requests to the Target server. As an example, if the Original Database processor was Little-endian and the Replay Database processor is Big-endian, fields such as Token lengths, Token values, and cursor numbers may need to be byte-swapped.

Further, the Replay process may also keep track of Test Server responses to SQLs such as Cursor Opens, Dynamic SQL Execution for errors, so that in case of Errors, subsequent SQLs within that particular client session referencing that particular cursor or Dynamic SQL may be skipped. In one aspect, the Replay process may also keep track of Dropped bytes so that if the Dropped bytes could not be handled gracefully, that particular SQL request may be skipped. In another aspect, the Replay process may also keep track of Sequence Numbers and in the event of skipped Requests due to Dropped bytes may change the Sequence numbers accordingly.

In yet another aspect, the Replay Process may keep track of the Original and Target Database versions as version changes may require changes to Request formats. In still another aspect, the Replay process may need to keep track of Cursor Fetches returning different rows during the Replay compared to the Original in which case appropriate action needs to be undertaken. For example, if the result of a Cursor Fetch during the Replay indicates End of Response with all rows returned, but in the original workload there are subsequent Cursor Fetches still occurring, then during the replay, such Cursor Fetches need to be ignored. Further, the Replay Process may need to keep track of the Character Encoding used by the Test Server as well as the Original Server and change Requests accordingly. The Replay process may need to save the Response of the Database Server to a 'Describe' SQL query and may need to have a mapping of the Original workload Describe statement to the Target.

All such substitutions done during the replay may be referred to collectively as 'Replay Re-Mapping'. This 'Replay Re-Mapping' happens in real-time during the replay. This re-mapping is needed to ensure the correctness of the Replay.

The Replay process may also keep track of TCP Fragmentation in the Source workload. TCP Fragmentation refers to the splitting of a single Application Layer PDU into multiple TCP packets due to size restrictions. The Replay process needs to reassemble multiple TCP Fragments and send Requests to the Test Server as a complete PDU (after reassembling and after Replay Mapping). In one aspect, if SSL Replay was configured during the pre-processing, the Replay process will SSL encrypt the sessions matching the filters configured.

Further, the Replay process also attempts to load-balance sessions amongst multiple target Listeners if more than one Target Listener IP/Port was configured. Target Listener implies the Target Database Server IP/Port. This could be beneficial in case of Replay to a cluster.

Furthermore, the Replay process also keeps track of Time Differences between Requests sent to the Test database server based on the Compression Rate configured. For example, if the configuration specifies no Time Compression (same Replay Rate), the Replay process will delay sending of Requests to maintain Time Synchronization with the Original Run. In case of additional delay being introduced because of Server Response delays, the Replay process will try to compensate for the additional delay by reducing the 'Sleep Time' between Requests so as to maintain Time Synchronization.

In addition, the Replay process also keeps track of Server Response times of the queries being replayed. If any query sent during the replay has not been responded to by the server within acceptable time differences compared to that query Response time seen during the Original pcap, the Replay process will fire a new trigger query to the Target Database requesting information such as Lock Status, IO status, Query Plan for that executing SQL. The information thus retrieved from the Target Server will be stored and will be available during the Report Generation. This process is a self-learning system and the observed Server Response times for individual SQLs are updated by the Reporting subsystem and a new baseline Server Response Time range is created for each type of SQL which may be used during a subsequent replay. Also, the replay process is configured to reconcile Character set differences during the replay of Mainframe database transactions onto a Non-Mainframe machine.

Maintaining Transactional Consistency Using Inter Session Synchronization

Real World Database Traffic under most circumstances has Inter Session Dependencies. This implies that the Server Response to a SQL from one client session may have dependency on a preceding Request from some other client session. As an example, one client session may fire a 'Create Table creditcardinfo' query and after some finite time thereafter, another client session may fire a 'Insert into creditcardinfo' query. If during the replay, the second query is fired before the first, it would result in an error as the 'creditcardinfo' table has not yet been created. As another example, the Order of inserts into a Table may have significance (such as in the case of a Trigger defined). Thus during the Replay the order of inserts would need to be maintained as in the original workload.

The Replay process will fire queries to the Test Server in the proper sequence as was seen in the Original Workload.

The sequence is decided on the basis of Timestamps present in the Original Workload pcap, the order of packets present in the pcap and using Commit Dependency Tracking output from Pre-Processing stage.

Using the Pre-Processing Commit Dependency tracking, the Replay scheduler 107B will re-schedule some transactions even though their Packet Timestamps may not be in the same order. The scheduled transactions will have dependent preceding transactions listed. The session handler thread within the Replay process handling individual sessions will check the dependent preceding transaction before sending out the Request to the Test Server. If the session handler detects that the preceding transaction has not been processed yet, it will block waiting for a signal from the preceding transaction handling thread. In this way, transactional sequence is maintained.

The level of Transactional Consistency offered by using this approach is very high, but it is not 100%. For a complete 100% Transactional Consistency, the only way would be to track transactions using Database internal Transaction Sequence numbers which are only available within the database process internally but are not exposed during Network Capture. But using the approach listed above should suffice for most practical workloads. Even after sending Requests in order of Transactions during the Replay, the Test Server may respond to queries in a different order compared to the Original Workload. The Replay scheduler will detect such out-of-order responses and re-schedule subsequent transactions based on the out-of-order response.

Replay Analytics and Reporting

During the replay, 'IO Capture' of the Replay may be started so as to capture the Replay workload.

After the replay is over, the Reporting subsystem will analyze both the Original TCP Aligned pcap file and the Replay pcap file and generate comprehensive analytics for comparison. The comparative report may be generated which can show the Replay summary comparison as well as SQL to SQL comparison and Return Data Divergence between the Original and Replay runs. The reports include comparison of SQLs after stripping off all dynamic parameters such as Username, field values, etc.

For SQLs wherein the Replay process fired extra information queries to the Target Server for slower running queries, the Reporting subsystem will include the results of information obtained from such queries such as Lock Status, IO status, Query Plans. The Reporting subsystem will also update the baseline for each type of SQL based on the current SQL Response Time which may be used during any subsequent replay.

Optional components may include comparing of Operating System (OS) metrics (such as CPU, Disk IO, Network statistics) between the Original and the Replay runs, in which case, the OS statistics collector must be started both during the Original Workload capture and during the Replay workload capture.

Optional components may include comparing internal Database metrics exposed by individual Database vendors (such as Locks held, Buffer Cache Hit Ratios, etc.) between the Original and the Replay runs, in which case, the Database statistics collector must be started both during the Original Workload capture and during the Replay workload capture.

Further, the method may be implemented, for example, by operating portion(s) of the system to execute a sequence of machine-readable instructions. The instructions can reside in various types of signal-bearing or data storage primary, secondary or tertiary media. The media may comprise, for example, RAM accessible by, or residing within, the components of the system. Whether contained in RAM, a diskette, or other secondary storage media, the instructions may be stored on a variety of machine-readable data storage media, such as RAM memory, flash memory, ROM memory, EPROM memory, EEPROM memory, registers, hard disk, a removable disk, a CD-ROM, or any other form of physical storage medium known in the art. An exemplary storage medium is coupled to the processor such that the processor can read information from, and write information to, the storage medium. In the alternative, the storage medium may be integral to the processor.

The foregoing detailed description has described only a few of the many possible implementations of the present invention. The above description is given only by way of illustration and nothing contained in this section should be construed to limit the scope of the invention.

What is claimed is:

1. A method for generating database transactions compatible for replaying, said method comprising:
monitoring data transmitted to/received from a source database server;
extracting transactions from the data thus monitored and storing the extracted transactions;
reordering the extracted transactions thus stored based on TCP header/footer information to obtain reordered transactions; and
pre-processing the reordered transactions based on multiple configuration parameters selected from a group consisting of: Target server IP/Ports, Target server user passwords, Replay Start Point, Session Level Filters, Compression Rate, Target Server Service Name, SSL Replay Session Level Filters, and Query Level Filters and database commit dependency, to generate pre-processed database transactions compatible for replaying.

2. The method as claimed in claim 1, wherein said extracting includes extracting transactions along with TCP header/footer information from the data communicated through TCP/IP protocol.

3. The method as claimed in claim 1, wherein said extracting includes extracting transactions from the data communicated through Inter Process Communication protocol and prepending dummy headers and dummy TCP sequence numbers to the transactions thus extracted.

4. The method as claimed in claim 1, wherein said reordering includes:
determining TCP sequence number and time stamp of each of the transactions thus captured; and
reordering transactions if the sequence number or the time stamp thus determined are out of order.

5. The method as claimed in claim 1, wherein said pre-processing includes:
a. analyzing multiple configuration parameters of the reordered transactions;
b. detecting commit dependent transactions among the reordered transactions; and
c. rescheduling the transactions based on the commit dependency of the transactions to obtain preprocessed transactions compatible for replaying.

6. A method for replaying database transactions, said method comprising:
re-mapping configuration and run time parameters of a target database server with the respective parameters of a source database server, said parameters including Server capabilities, Login password, Server service name, SQL cursor IDs, Large Object (LOB) descriptors, ROWIDs; and reading and replaying database transactions onto the target database server, wherein the said database transactions thus read and replayed are based on database transactions that occurred on the source database server and that have been reordered based on TCP header/footer information and pre-processed based on multiple configuration parameters selected from a group consisting of: Target server IP/Ports, Target server user passwords, Replay Start Point, Session Level Filters, Compression Rate, Target Server Service Name, SSL Replay Session Level Filters, and Query Level Filters and database commit dependency.

7. The method as claimed in claim 6, wherein re-mapping includes reconciling Character set differences during the replay of Mainframe database transactions onto a Non-Mainframe machine.

8. The method as claimed in claim 6, further comprising monitoring the performance of the target database server and generating reports based on the same.

9. The method as claimed in claim 8, wherein said monitoring and generating comprises
 a. monitoring data transmitted to/received from the target database server;
 b. extracting transactions from the data thus monitored and storing the extracted transactions;
 c. comparing transactions occurred at the source database server with the extracted transactions of the target database server; and
 d. generating reports based on the comparison.

10. A method for replaying database transactions, said method comprising:
 a. capturing database transactions occurring on a source database server and storing the captured transactions;
 b. reordering the captured transactions to obtain reordered transactions;
 c. pre-processing the reordered transactions to obtain pre-processed transactions compatible for replaying; and
 d. replaying the preprocessed transactions onto a target database server;
wherein the captured transactions are reordered based on TCP header/footer information; wherein the reordered transactions are pre-processed based on multiple parameters selected from a group consisting of: Target server IP/Ports, Target server user passwords, Replay Start Point, Session Level Filters, Compression Rate, Target Server Service Name, SSL Replay Session Level Filters, and Query Level Filters and database commit dependency, to obtain transactions compatible for replaying.

11. The method as claimed in claim 10, wherein said pre-processing includes analyzing multiple configuration parameters, detecting commit dependent transactions, rescheduling the detected transactions based on commit dependency of the transactions to generate preprocessed transactions compatible for replaying.

12. The method as claimed in claim 10, further comprising:
 a. monitoring the performance of the target database server; and
 b. generating reports based on the comparison of performance of the source database server with the target database server.

13. A computing system for generating database transactions compatible for replaying, said system comprising:
 a processor coupled to a memory;
 an IO capturing sub-system, communicatively coupled with a source database server and being configured to monitor data transmitted to/received from the source database server; and
 extract transactions from the data thus monitored and store the extracted transactions; a TCP reordering sub-system, communicatively coupled with the IO capturing sub-system and being configured to reorder the extracted transactions thus stored based on TCP header/footer information to obtain reordered transactions; and
 a pre-processing sub-system, communicatively coupled with the TCP reordering sub-system and being configured to pre-process the reordered transactions based on multiple configuration parameters selected from a group consisting of: Target server IP/Ports, Target server user passwords, Replay Start Point, Session Level Filters, Compression Rate, Target Server Service Name, SSL Replay Session Level Filters, and Query Level Filters and database commit dependency, to obtain pre-processed transactions compatible for replaying.

14. The system as claimed in claim 13, wherein said IO capturing subsystem is a network capture subsystem located in a remote server.

15. The system as claimed in claim 13, wherein said IO capturing subsystem is a kernel capture subsystem located in a source database server.

16. A computing system for replaying database transactions, said system comprising:
 a processor coupled to a memory;
 a re-mapping component, being configured to remap configuration and run time parameters of a target database server with the respective parameters of a source database server, said parameters including Server capabilities, Login password, Server service name, SQL cursor IDs, Large Object (LOB) descriptors, ROWIDs; and
 a replay scheduler, being configured to read and execute database transactions, wherein the said database transactions thus read and replayed are based on database transactions that occurred on the source database server and that have been reordered based on TCP header/footer information and pre-processed based on multiple configuration parameters selected from a group consisting of: Target server IP/Ports, Target server user passwords, Replay Start Point, Session Level Filters, Compression Rate, Target Server Service Name, SSL Replay Session Level Filters, and Query Level Filters and database commit dependency.

17. The system as claimed in claim 16, further comprising a Character set mapping system configured to reconcile Character set differences during the replay of Mainframe database transactions onto a Non-Mainframe machine.

18. The system as claimed in claim 16, further comprising a reporting subsystem communicatively coupled with the target database server, and being configured to monitor the performance of the target database server and generate reports based on the same.

19. A computing system for replaying database transactions of a source database server onto a target database server, said system comprising:
 a. a processor coupled to a memory;
 b. an IO capturing subsystem, communicatively coupled to the source database server and being configured to capture and store the database transactions transmitted to/received from the source database server;
 c. a TCP reordering subsystem, communicatively coupled to the IO capturing subsystem and being configured to receive the captured database transactions and reorder the said transactions;
 d. a pre-processing subsystem, communicatively coupled with the TCP reordering sub-system and being configured to pre-process the reordered transactions; and e. a replay subsystem, communicatively coupled to the target database server and being configured to receive the preprocessed transactions from the said pre-processing subsystem and replay the preprocessed transactions thus received;

wherein, the TCP reordering subsystem is being configured to reorder the captured transactions based on TCP header/footer information; wherein the pre-processing sub-system is being configured to pre-process the reordered transactions based on multiple parameters selected from a group consisting of: Target server IP/Ports, Target server user passwords, Replay Start Point, Session Level Filters, Compression Rate, Target Server Service Name, SSL Replay Session Level Filters, and Query Level Filters and database commit dependency, to obtain transactions compatible for replaying.

20. The system as claimed in claim 19, wherein said IO capturing subsystem comprises a Network capture device, being configured to capture the transactions communicated through TCP/IP protocol.

21. The system as claimed in claim 19, wherein said IO capturing subsystem comprises a Kernel Capture device, being configured to capture the transactions communicated through Inter Process Communication (IPC).

22. The system as claimed in claim 19, wherein said TCP reordering subsystem is configured to:
determine TCP sequence number and time stamp of each of the transactions thus captured; and
reorder the transactions if the sequence number or the time stamp thus determined are out of order.

23. The system as claimed in claim 19, further comprising a Reporting subsystem configured to monitor the performance of the target database server and to generate a report based on comparison of the performance of the source database server and the target database server.

24. A computer-readable medium comprising instructions, which, when executed by a computer system, cause the system to perform operations, the instructions comprising:
monitoring data transmitted to/received from a source database server; extracting transactions from the data thus monitored and storing the extracted transactions;
reordering the extracted transactions thus stored based on TCP header/footer information to obtain reordered transactions; and
pre-processing the reordered transactions based on multiple configuration parameters selected from a group consisting of: Target server IP/Ports, Target server user passwords, Replay Start Point, Session Level Filters, Compression Rate, Target Server Service Name, SSL Replay Session Level Filters, and Query Level Filters and database commit dependency, to generate pre-processed database transactions compatible for replaying.

25. The computer readable medium as claimed in claim 24, wherein instructions for extracting includes instructions for extracting transactions along with TCP header/footer information from the data communicated through TCP/IP protocol.

26. The computer readable medium as claimed in claim 24, wherein said instructions for extracting includes instructions for extracting transactions from the data communicated through Inter Process Communication protocol and prepending dummy headers and dummy TCP sequence numbers to the transactions thus extracted.

27. The computer readable medium as claimed in claim 24, wherein instructions for reordering includes instructions for:
determining TCP sequence number and time stamp of each of the transactions thus captured; and
reordering transactions if the sequence number or the time stamp thus determined are out of order.

28. The computer readable medium as claimed in claim 24, wherein instructions for pre-processing includes instructions for:
a. analyzing multiple configuration parameters of the reordered transactions;
b. detecting commit dependent transactions among the reordered transactions; and
rescheduling the transactions based on the commit dependency of the transactions to obtain preprocessed transactions compatible for replaying.

29. A computer-readable medium comprising instructions, which, when executed by a computer system, cause the system to perform operations, the instructions comprising:
re-mapping configuration and run time parameters of a target database server with the respective parameters of a source database server, said parameters including Server capabilities, Login password, Server service name, SQL cursor IDs, Large Object (LOB) descriptors, ROWIDs; and
reading and replaying database transactions onto the target database server, wherein the said database transactions thus read and replayed are based on database transactions that occurred on the source database server and that have been reordered based on TCP header/footer information and pre-processed based on multiple configuration parameters selected from a group consisting of: Target server IP/Ports, Target server user passwords, Replay Start Point, Session Level Filters, Compression Rate, Target Server Service Name, SSL Replay Session Level Filters, and Query Level Filters and database commit dependency.

30. The computer readable medium as claimed in claim 29, wherein instructions for re-mapping includes instructions for reconciling Character set differences during the replay of Mainframe database transactions onto a Non-Mainframe machine.

31. The computer readable medium as claimed in claim 29, further comprising instructions for monitoring the performance of the target database server and generating reports based on the same.

32. The computer readable medium as claimed in claim 31, wherein instructions for said monitoring and generating comprises instructions for:
a. monitoring data transmitted to/received from the target database server;
b. extracting transactions from the data thus monitored and storing the extracted transactions;
c. comparing transactions occurred at the source database server with the extracted transactions of the target database server; and
d. generating reports based on the comparison.

33. A computer-readable medium comprising instructions, which, when executed by a computer system, cause the system to perform operations, the instructions comprising:
a. capturing database transactions occurring on a source database server and storing the captured transactions;
b. reordering the captured transactions to obtain reordered transactions;
c. pre-processing the reordered transactions to obtain pre-processed transactions compatible for replaying; and
d. replaying the preprocessed transactions onto a target database server;
wherein the captured transactions are reordered based on TCP header/footer information;

wherein the reordered transactions are pre-processed based on multiple parameters selected from a group consisting of: Target server IP/Ports, Target server user passwords, Replay Start Point, Session Level Filters, Compression Rate, Target Server Service Name, SSL Replay Session Level Filters, and Query Level Filters and database commit dependency to obtain transactions compatible for replaying.

34. The computer readable medium as claimed in claim 33, wherein instructions for pre-processing includes instructions for analyzing multiple configuration parameters, detecting commit dependent transactions, rescheduling the detected transactions based on commit dependency of the transactions to generate preprocessed transactions compatible for replaying.

35. The computer readable medium as claimed in claim 33, further comprising instructions for:
  a. monitoring the performance of the target database server; and
  b. generating reports based on the comparison of performance of the source database server with the target database server.

* * * * *